United States Patent Office 3,562,921
Patented Feb. 16, 1971

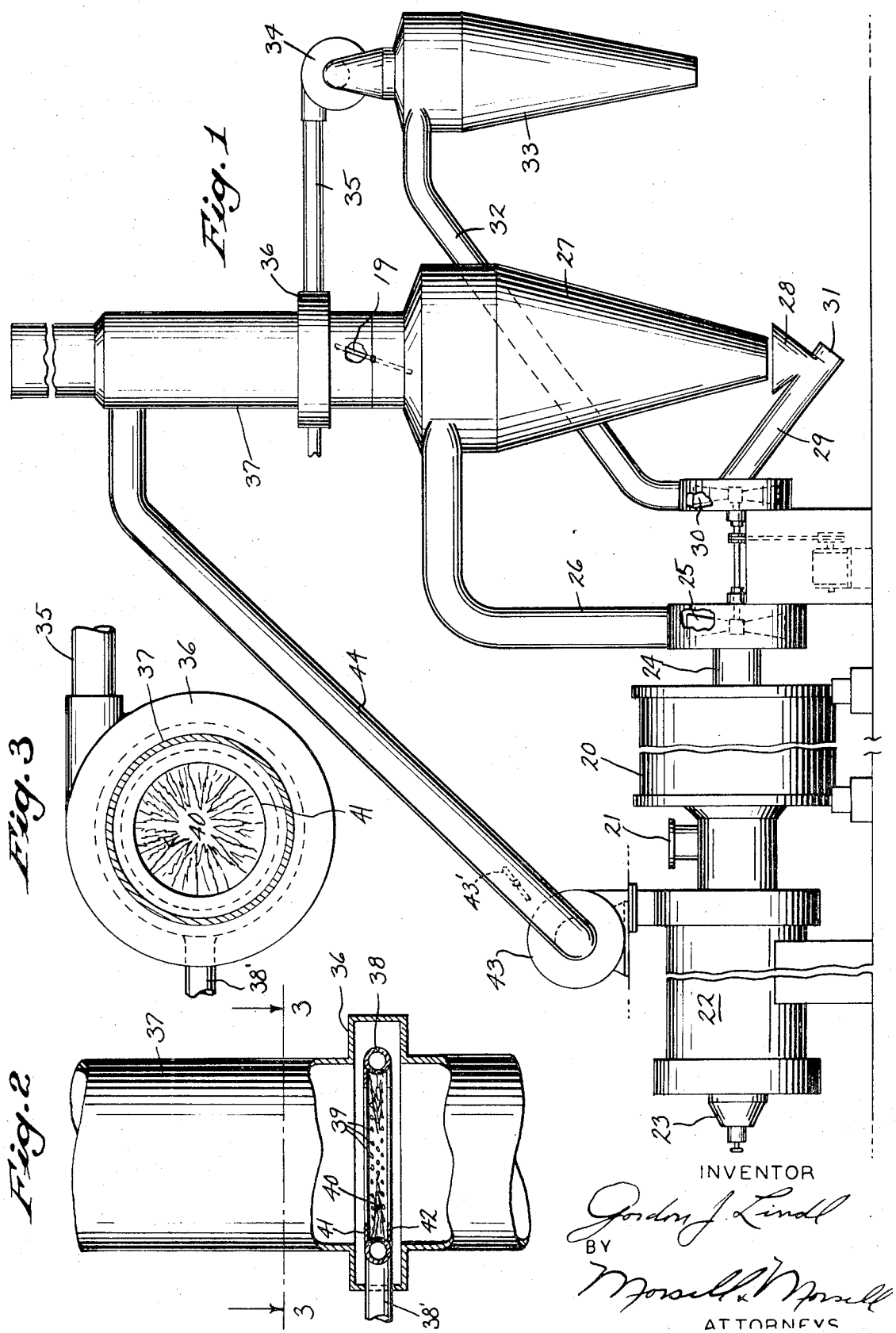

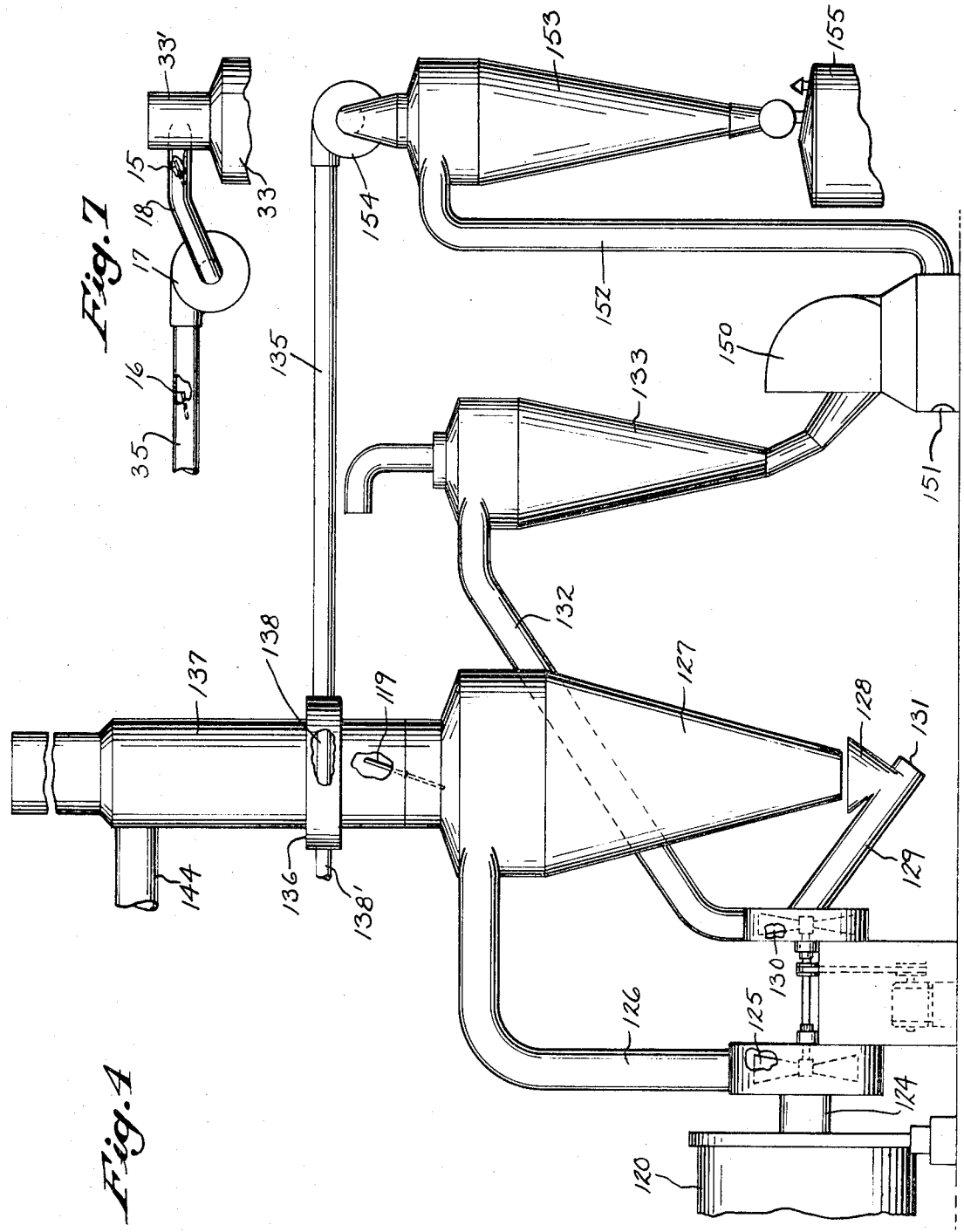

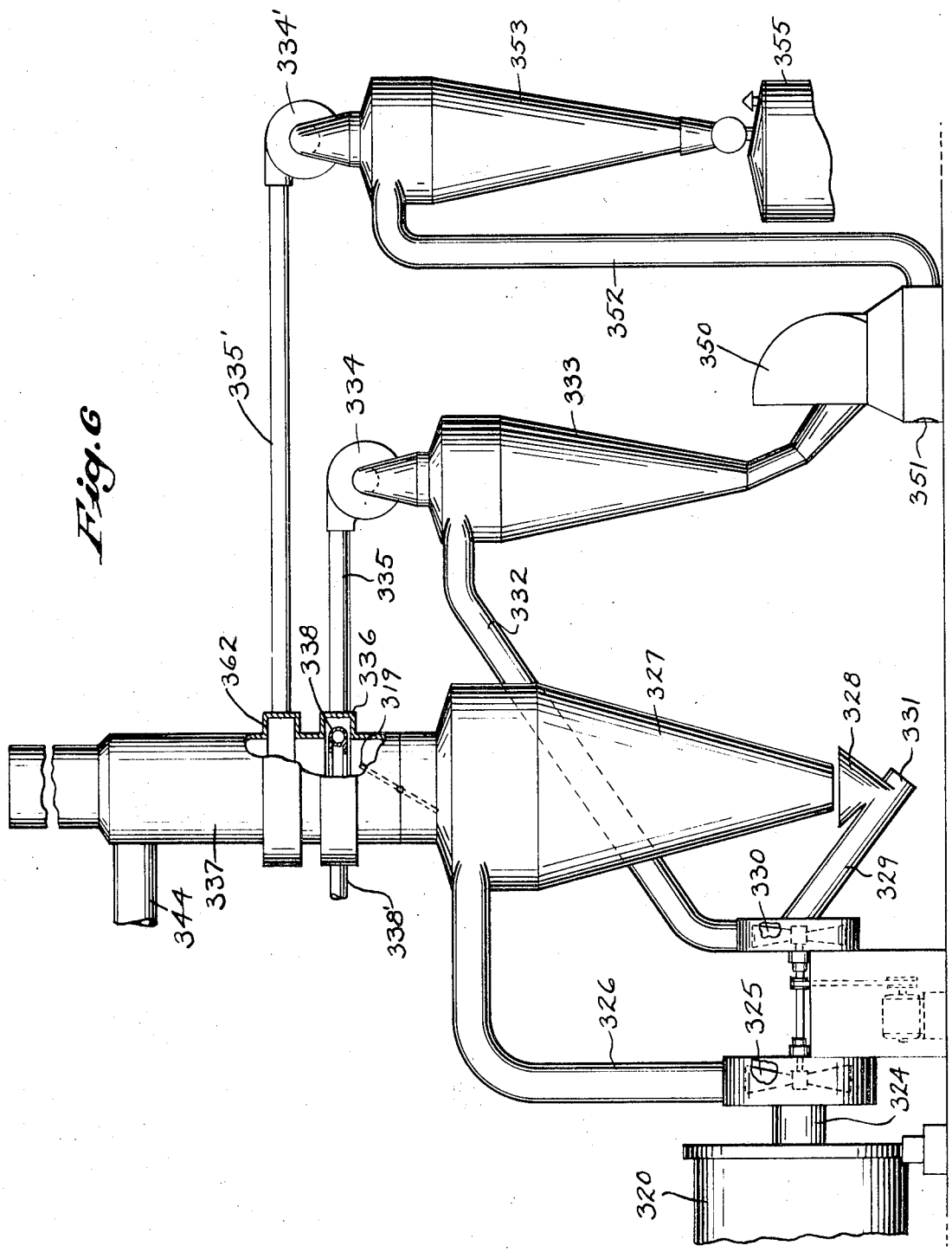

3,562,921
DEHYDRATOR WITH ODOR INCINERATION
Gordon J. Lindl, West Allis, Wis., assignor to Arnold Dryer Company, Milwaukee, Wis., a corporation of Wisconsin
Filed Aug. 18, 1969, Ser. No. 850,813
Int. Cl. F26b 19/00
U.S. Cl. 34—63    7 Claims

ABSTRACT OF THE DISCLOSURE

The stack from the main collector of a dehydrator is equipped with a superheating burner to which primary combustion air is furnished from the exhaust of an auxiliary collector such as the cooling collector, the hammer mill collector, or the pellet cooling collector, or combinations of said auxiliary collectors. The superheating burners are positioned to incinerate odors and particulate matter discharged from the main dryer collector and a substantial percentage of superheated gases are returned to the furnace for the main dryer.

BACKGROUND OF THE INVENTION

Field of the invention

The present invention is particularly useful in dehydrators used for drying material such as hay, alfalfa, brewers' or distillers' grains, fish meal, citrus wastes, animal manure, wet corn milling byproducts, and forest products such as for the particle board industry where the exhaust gases contain both particulate matter and air pollutants in gaseous form, there usually being air pollution and odor problems in connection with such dehydrating operations.

Description of the prior art

It has heretofore been proposed to heat gases in a dryer stack and to recirculate some of the heat from the stack burners to the dryer. Such an arrangement is disclosed in Hayes Pat. No. 2,743,529 where the exhaust from a drying oven passes through a catalytic unit to catalytically oxidize the combustible matter, the oxidized exhaust gases being recovered and directed back to the dryer. This device is designed for use in ovens which are adapted for the baking or drying of enameled steel strip. There is no separation of dried material by means of a collector.

It has also been proposed in the prior art to return exhaust gases from a collector to a dryer such as in Davis Pat. No. 2,836,901. Here, however, there is no superheating of the gases prior to their return, with no utilization of the "smoke burner" for this purpose. Furthermore, in the prior art combustion air for the superheating burners is supplied in the usual manner.

Applicant is familiar with no prior art which discloses the incineration of odors and particulate matter which are discharged from a collector, or prior art where the primary combustion air for the superheating burners is furnished by an auxiliary collector or by a plurality of auxiliary collectors.

SUMMARY OF THE INVENTION

The present invention provides, in a dehydrator system with a main dryer collector having an exhaust system, a superheating burner associated with the exhaust system, means for returning a substantial part of the superheated gases to the burner for the main dryer, and means whereby the exhaust from an auxiliary collector, such as from the cooling collector, or the hammer mill collector, or the pellet cooler, or from the combinations thereof, is used as the primary combustion air for the superheating burners.

A general object of the invention is to provide a dehydrator wherein odors are incinerated in the stack leading from the main dryer collector in a very efficient manner with the use of superheating burners, a substantial part of the superheated gases being returned to the burner for the main dryer, and the superheating burner being efficiently supplied with primary combustion air from one of the auxiliary collectors, such as the cooling collector, or from the second stage aeration system of the dryer, whereby the discharge from said auxiliary collector or collectors is also incinerated to remove odors and particulate matter.

A further object of the invention is to provide a drying system as above described wherein gases are returned to the main burner from the superheating burner without the usual condensation problem which is present when it is attempted to return flue gases at normal temperatures to the main dryer or burner therefor.

A further object of the invention is to provide an improved dehydrator wherein less fuel input is required in the main burners due to the return of heat from the superheating burners.

A further object of the invention is to provide a dehydrator where the exceptional drying ability of superheated vapors from the stack is utilized in the dryer to render the drying operation more efficient.

Other objects of the invention are to provide a dehydrator wherein air stratification is eliminated or minimized at the inlet to the dryer, wherein there is heat saving due to the recirculation of part of the heat which would otherwise be wasted, and wherein odors which are not incinerated in the superheating burners are further incinerated in the main furnace for the dryer upon return thereto.

With the above and other objects in view, the invention consists of the improved dehydrator with odor incineration, and all of its parts and combinations, as set forth in the claims, and all equivalents thereof.

BRIEF DESCRIPTION OF THE DRAWINGS

In the accompanying drawings, in which the same reference numerals designate the same or similar parts in all of the views:

FIG. 1 is a front elevational view of a dehydrator system in which the stack from the collector for the main dehydrator has superheating burners associated therewith which receive primary combustion air from the exhaust of the cooling collector, parts being broken away in order to foreshorten the same;

FIG. 2 is an enlarged fragmentary view of a portion of the stack, with a portion broken away and shown in vertical section to illustrate the superheating burner;

FIG. 3 is a sectional view taken on the line 3—3 of FIG. 2;

FIG. 4 is a view similar to FIG. 1 showing a modification which includes a hammer mill and a hammer mill collector, the primary air for combustion of the superheating burner being furnished from the hammer mill collector rather than from the cooling collector, only a portion of the main dehydrator being illustrated;

FIG. 6 is a view similar to FIG. 4 showing two superheating burners associated with the stack from the main dryer collector, one of the burners receiving its primary combustion air from the cooling collector and the other burner receiving its primary combustion air from the hammer mill collector; and FIG. 7 is a fragmentary elevational view showing a modified type of discharge from an auxiliary collector.

DESCRIPTION OF THE PREFERRED EMBODIMENTS

Figure 5:
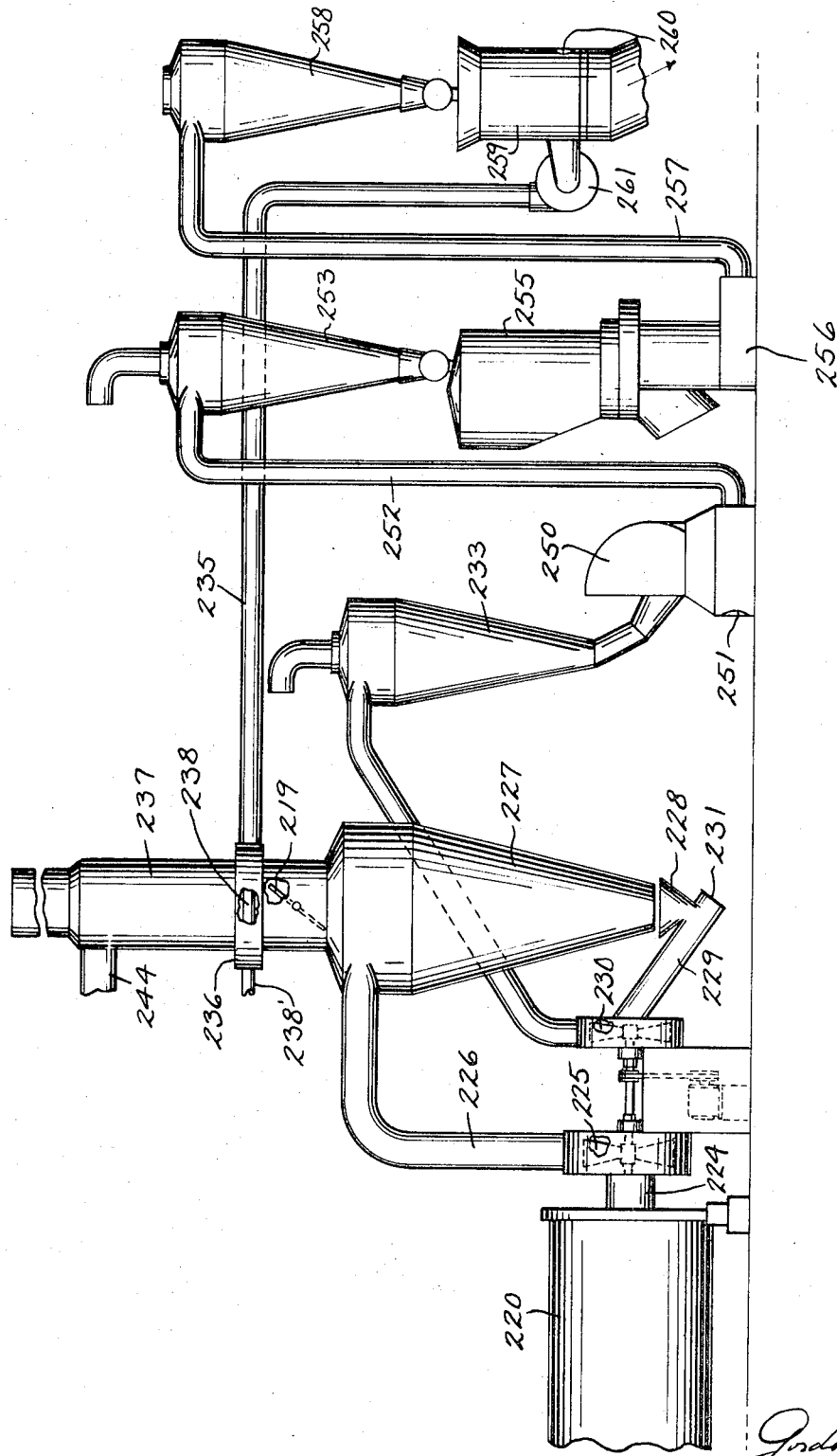
FIG. 5 is a view similar to FIG. 4 with the addition of a meal bin into which the hammer mill collector discharges, the view also showing an additional collector which discharges pellets into a bin, there being means for exhausting air from the bin, which exhaust is connected with the superheating burners to furnish the primary combustion air therefor as an alternative to the arrangement shown in FIGS. 1 or 4.

Referring first to FIGS. 1–3 of the drawing, there is a suitable dryer 20 which may be a rotary drum dryer to which the product to be dried is fed through an inlet 21. Heat for the dryer is furnished by a furnace 22 which includes an oil or gas burner 23.

This dryer is particularly suitable for the drying of alfalfa, but the invention may also be very useful in connection with the drying of hay, brewers' or distillers' grains, fish meal, citrus wastes, animal manure, wet corn milling byproducts, and forest products such as for the particle board industry and like materials.

The dried product is discharged through a discharge conduit 24 and is propelled by a fan 25 through an exhaust conduit 26 leading to the top of a main dryer collector and aerator 27 of the well known type having a centrifugal cyclonic action. The exhaust conduit 26 enters the collector in such a location that the exhausted gases and product are directed to swirl in a predetermined direction into the collector. In the collector the dried product is precipitated to the bottom into a receiving hopper 28 leading into the end of a duct 29. A fan 30 moves the dehydrated product upwardly in the conduit 29 together with fresh air which enters the end 31 of the pipe 29. The dehydrated product is then delivered by the pipe 32 into the upper end of an auxiliary collector which, in this instance, is a cooling collector and aerator 33 of the same centrifugal cyclonic type as the collector 27. This cools and conditions the dehydrated product and the latter is discharged from the bottom of the cooling collector for use or further processing.

The exhaust from the cooling collector, which includes fresh air and particulate matter, is conveyed by a fan 34 through a duct 35 leading to a manifold 36 which surrounds the stack 37 or exhaust system leading from the main dryer collector 27. There is a damper 19 in the stack ahead of the burner to balance the flow of gases from the collector and control the time of exposure of the gases in the exhaust system. Suitably supported in the manifold 36, as shown in FIG. 2, is a suitable burner or burners such as the ring burner 38, hereinafter termed a "superheating burner." It may be furnished with gas from an inlet pipe 38'. The ring burner has jet openings 39 on its inner periphery and directs flames 40 radially inwardly as shown in FIGS. 2 and 3, there preferably being upper and lower flame retention rings 41 and 42 associated with the burner.

The exhaust gases and particulate matter from the cooling collector are preferably delivered into the manifold 36 as shown in FIG. 3 to flow in a direction to match the direction of the swirl of the gases from the main dryer collector 27. This matching of the direction of swirl is highly desirable so as not to upset the circulation from the main dryer collector. The exhaust gases from the cooling collector 33 furnish the primary air for combustion to the gas burner 38 and, inasmuch as this primary air is warm, there is an increase in efficiency. The result of having the gas burner located as shown is to incinerate odors and particulate matter which are exhausted from the main dryer collector 27 and, with the present invention, any odors or particulate matter exhausted from the cooling collector 33 are also incinerated. Thus this return from the auxiliary collector 33 serves the dual function of furnishing the primary combustion air to the burner 38 and of incinerating the odors and particulate matter in the gas from the cooling collector.

A large percentage of the superheated exhaust gases are drawn off by the fan 43 through the pipe 44 and are thereafter recirculated to the furnace 22 for the dryer 20. Heretofore, when it has been attempted to return gases at normal exhaust temperatures to a dryer there has been condensation in the return pipe, such as the pipe 44, with the solids precipitating out and causing plugging. However, by returning superheated gases, condensation or contamination or plugging of the return duct is eliminated. These return gases are again incinerated in the furnace 22 to re-incinerate any remaining odors or particulate matter. In conventional dryer operation the temperature of the exhaust gases in the stack 37 is between 200–250° F. With the use of the superheating burner this temperature is raised to the region of 500°–600° F. and upwards. The result of this dryer system is that the gases which are finally discharged into the atmosphere have a minimum of odor and particulate matter. Thus air pollution is reduced to a minimum. There is a damper 43' in the duct 44.

In the modified system shown in FIG. 4, the primary air for combustion is furnished to the gas burner by a different auxiliary collector, also of the same centrifugal cyclonic type as the main collector 27. In this instance it is the exhaust from the hammer mill collector which is used as the primary air for combustion. In FIG. 4 all of the parts in common with FIG. 1 are designated by the same numerals preceded by the digit "1." In this modification the dehydrated product which is discharged from the cooling collector 133 is received in a hammer mill 150. Air enters the hammer mill at 151 and the ground product in the form of meal, together with air, is directed upwardly through a conduit 152 into the hammer mill collector 153. The exhaust from the latter is discharged by a fan 154 through a conduit 135 which furnishes the primary air for combustion to the superheating burner 138. It is to be noted that in FIG. 4 the exhaust from the cooling collector 133 is discharged to the atmosphere.

In the modification shown in FIG. 5 the same reference numerals are used for parts in common with those illustrated in FIG. 1 except that they are preceded by the digit "2." This form of the invention includes all of the items of FIG. 4, and in this form of the invention the hammer mill collector 253 discharges into a meal bin 255 which, in turn, discharges into a pellet mill 256 from which pellets are conveyed through a pipe 257 to a pellet receiver and classifier 258, which discharges into a pellet cooler 259 which is also termed an auxiliary collector. Air enters the pellet cooler through an opening 260 and this air picks up the heat and particulate matter from the pellets and is discharged by a fan 261. In this form of the invention the discharge from the fan 261 may be carried by the pipe 235 back to the superheating burner to furnish the primary air for combustion. When this is the case the cooling collector 233 and the hammer mill collector 253 may discharge directly to the atmosphere. As an alternative, the pipe 235 may connect with the pellet receiver 258 instead of with the pellet cooler, there being a suitable exhaust fan.

The form of the invention illustrated in FIG. 6 is similar to the form of the invention of FIG. 4, and all common parts are designated by the same reference numerals preceded by the digit "3." In this form of the invention there is a second manifold 362 on the stack 337 leading from the main dryer collector 327. This manifold receives the exhaust from the hammer mill collector through the conduit 335', the exhaust 335 from the cooler collector 333 being conducted to the superheating burner manifold 336 just as in the form of the invention of FIG. 1. The second manifold is shown without an additional burner, but in certain instances it may be desirable to also have a burner in the manifold 362. Thus, in FIG. 6, the exhaust from the cooling collector furnishes the primary air for combustion for the superheating gas burner 338, but, in addition, the exhaust from the hammer mill collector 353 is in a manifold so close to the gas burner that the exhaust gases and particulate matter from the hammer mill are also incinerated and superheated by the superheating gas burner 338.

In all forms of the invention the primary air for combustion which is furnished from one of the auxiliary collectors to the superheating burner is an amount which balances the need of the superheating burner. In the arrangment illustrated in FIG. 1 the volume of air delivered to the manifold 36 from the pipe 35 can be controlled by the speed of the fan 34, the fan having variable speed drive. In lieu of this, the arrangement illustrated in FIG. 7 may be employed. Here the auxiliary collector, such as the cooling collector 33, discharges into its own stack 33' and there is a tangential take-off by a pipe 18 leading to a constant speed fan 19. When this is done there should be a damper 16 in the conduit 35 so that the amount of air going to the manifold 36 can be controlled to provide proper balancing to suit the combustion process. It is also desirable to have another damper 15 located near the take-off from the stack 33' so that in case the main exhaust system is inoperative the damper 15 can be closed to prevent buildup of particulate matter in the fan 17 and ducts 35 and 18. The arrangement of FIG. 7 may be used in the pipe 135 of FIG. 4, or 235 of FIG. 5, or 334 of FIG. 6 in lieu of the arrangement illustrated in said figures.

It is apparent that in all forms of the invention the exhaust from an auxiliary collector such as the cooling collector 27 of FIG. 1, the hammer mill collector 153 of FIG. 4, the pellet collector 259 of FIG. 5, or the exhaust from combinations of collectors such as illustrated in FIG. 6, is conveyed to a superheating and incinerating burner to furnish the primary combustion air for said burner while, at the same time, the odors and particulate matter from the main collector 27, 127, 227, or 327, as well as the gases from the auxiliary collectors, is acted upon by the superheating burner for a sufficient period of time to incinerate odors and particulate matter and prevent air pollution. As an example, when the exhaust gases are between 500° F.–600° F. or higher the time of exposure will be between .3 and .7 of a second. At the same time a maximum amount of this heat from the superheating burner is recovered and returned through the pipes 44, 144, 244, or 344 to the furnace for the main dryer for use in increasing the efficiency of the drying process.

It is to be understood that I do not desire to be limited to the exact details of construction shown and described, for obvious modifications will occur to a person skilled in the art.

What I claim is:

1. In a dehydrating system having a dryer with a furnace and having a main collector into which the dried material is fed, the dried material being discharged from said collector, an exhaust system into which the exhaust gases containing unprecipitated particulate matter are directed from the collector, a superheating burner associated with said exhaust system in a position to incinerate odors and particulate matter in the exhaust gases and to superheat the latter, and means for returning a substantial part of the superheated gases to the dryer.

2. A dehydrating system as claimed in claim 1 in which there is an auxiliary collector, means for conducting the precipitated dried material from the main collector into the auxiliary collector, and means for directing the exhaust gases together with particulate matter from the auxiliary collector to the superheating burner in the exhaust system to furnish the primary air for combustion for said burner.

3. A dehydrating system as claimed in claim 2 in which the auxiliary collector is a cooling collector.

4. A dehydrating system as claimed in claim 3 in which the auxiliary collector is a hammer mill collector.

5. A dehydrating system as claimed in claim 2 in which the auxiliary collector is a pellet cooler.

6. A dehydrating system as claimed in claim 1 in which there are a plurality of auxiliary collectors and in which the exhaust gases from a plurality of auxiliary collectors is supplied to the exhaust system adjacent the superheating burner with the exhaust from at least one of said auxiliary collectors furnishing the primary combustion air for said burner.

7. A dehydrating system as claimed in claim 1 in which the dried material introduced into the collector is caused to swirl in a predetermined direction so that the gases being exhausted are caused to swirl in the same direction, and in which primary combustion air is delivered to the superheating burner in a manner to cause it to swirl in the same direction as the exhaust gases.

References Cited

UNITED STATES PATENTS

| | | | |
|---|---|---|---|
| 2,715,283 | 8/1955 | Halldorsson | 34—79 |
| 2,720,710 | 10/1955 | Erisman | 34—79X |
| 2,743,529 | 5/1956 | Hayes | 34—35 |
| 2,836,901 | 6/1958 | Davis | 34—86X |

FREDERICK L. MATTESON, Jr., Primary Examiner

H. B. RAMEY, Assistant Examiner

U.S. Cl. X.R.

34—79, 86